(12) United States Patent
Kyeong et al.

(10) Patent No.: US 8,750,401 B2
(45) Date of Patent: Jun. 10, 2014

(54) SEQUENTIAL TRANSMISSION MULTI-BEAMFORMING METHOD WITH LOW COMPLEXITY USING HADAMARD MATRIX

(75) Inventors: Mun Geon Kyeong, Daejeon (KR); Won Cheol Lee, Seoul (KR); Woo Yong Lee, Daejeon (KR); Kapseok Chang, Daejeon (KR); Seung Eun Hong, Daejeon (KR); Hyung Min Chang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 452 days.

(21) Appl. No.: 12/969,135

(22) Filed: Dec. 15, 2010

(65) Prior Publication Data

US 2011/0142154 A1    Jun. 16, 2011

(30) Foreign Application Priority Data

Dec. 16, 2009   (KR) .................. 10-2009-0125261
Mar. 18, 2010   (KR) .................. 10-2010-0024100

(51) Int. Cl.
*H04B 7/06*   (2006.01)
*H04B 7/08*   (2006.01)
*H04L 1/02*   (2006.01)

(52) U.S. Cl.
USPC ........................ 375/267; 375/299; 375/347

(58) Field of Classification Search
CPC .. H04B 7/0408; H04B 7/0617; H04B 7/0619; H04B 7/0634; H04B 7/088; H04B 7/0413; H04B 7/0417

USPC ......... 375/267, 299, 340, 347; 455/101, 272, 455/69

See application file for complete search history.

(56) References Cited

U.S. PATENT DOCUMENTS

| | | | |
|---|---|---|---|
| 2006/0268623 A1 | 11/2006 | Chae et al. | |
| 2007/0206626 A1* | 9/2007 | Lee et al. | 370/437 |
| 2008/0144733 A1 | 6/2008 | ElGamal et al. | |
| 2008/0227495 A1 | 9/2008 | Kotecha et al. | 455/562.1 |
| 2008/0256163 A1* | 10/2008 | Clerckx et al. | 708/607 |
| 2009/0160707 A1* | 6/2009 | Lakkis | 342/367 |

FOREIGN PATENT DOCUMENTS

| | | |
|---|---|---|
| KR | 10-2006-0097519 A | 9/2006 |
| KR | 10-2008-0026019 | 3/2008 |

OTHER PUBLICATIONS

Taeyoon Sung, et al, "MIMO-Based Base Station Cooperative Transmission for the Next Generation Communication System", Telecommunication Review, vol. 19, No. 4, pp. 619-633, Aug. 2009.
Korean Office Action issued Apr. 13, 2011 in corresponding Korean Patent Application 10-2010-0024100.

\* cited by examiner

*Primary Examiner* — Betsy Deppe
(74) *Attorney, Agent, or Firm* — Staas & Halsey LLP

(57) ABSTRACT

Provided is a sequential transmission multi-beamforming apparatus and method with a low complexity based on a Hadamard matrix. A simple codebook may be generated based on the Hadamard matrix and thus, a number of weighted-vectors is reduced and a complexity of hardware is decreased. A diversity gain may be maximized based on a spatial diversity processing apparatus and a beamforming weighted vector may be systematically generated.

11 Claims, 5 Drawing Sheets

SEQUENTIAL TRANSMISSION MULTI-BEAMFORMING METHOD WITH LOW COMPLEXITY USING HADAMARD MATRIX

CROSS-REFERENCE TO RELATED APPLICATION(S)

This application claims the benefit of Korean Patent Application Nos. 10-2009-0125261 and 10-2010-0024100, respectively filed on Dec. 16, 2009 and Mar. 18, 2010, in the Korean Intellectual Property Office, the disclosure of which is incorporated herein by reference.

BACKGROUND

1. Field of the Invention

The present invention relates to a transmission and reception multi-beamforming method using a multi-transmission antenna and a multi-reception antenna, and more particularly, to a transmission and reception multi-beamforming method based on a codebook.

2. Description of the Related Art

The present invention provides a transmission and reception multi-beamforming scheme using a multi-transmission antenna and a multi-reception antenna, and the transmission and reception multi-beamforming scheme based on a codebook.

The beamforming scheme may directionally transmit and receive, using a multi-antenna, a radio wave based on a spatial distribution of users and thus, may reduce interference and may increase a power efficiency and a quality of communication. The multi-antenna for beamforming may use a linear antenna array, a plane antenna array, and the like.

In the multi-antenna system, a beamforming apparatus may perform beamforming by applying weights appropriate for each transmission and reception antenna. Weighted signals, which are generated by multiplying signals and the weight, are added together and the beamforming may be performed using the added signals as an output signal.

A multi-antenna beamforming scheme may be applicable to each of a transmitting end and a receiving end, and weights for beamforming may be appropriately selected and used based on an environment and a location between the transmitting and receiving end.

A beamforming scheme based on a codebook may be a scheme that predetermines weighted-vectors for the beamforming and may select an optimal beamforming weighted-vector based on the transmission and reception environment to increase the quality of communication.

The weights used by a multi-beamforming apparatus may be classified, based on an antenna array, as a weighted-vector to be used for a one-dimensional array, such as the linear antenna array, and a weighted-matrix to be used for a two-dimensional array, such as the plane antenna array. The weighted-vector used for the two-dimensional array may be calculated based on the weighted-vector used for the one-dimensional array, as expressed by Equation 1.

$$W_{k,l} = (\underline{w}^k)^T \cdot \underline{w}^l. \qquad \text{[Equation 1]}$$

In Equation 1, $w^k$ may denote a $k^{th}$ weighed-vector and $w^l$ may denote a first weighed-vector. $(g)^T$ may denote a transposed matrix.

A spatial diversity processing apparatus may be applied to the receiving end to enhance a quality of a received signal. A complex channel gain between an $i^{th}$ transmission beam and a $j^{th}$ reception beam may be sequentially estimated with respect to N transmission beams, a complex channel gain or the estimated complex channel gain are multiplexed with a transmission beam weighted-matrix, and the multiplexed value is transmitted to the transmitting end and applied to the multi-beamforming apparatus. Lastly, a gain of the spatial diversity may be expressed by Equation 2.

$$G_{div} = \sum_{i=1}^{N} \sum_{j=1}^{N} |h_{i,j}|^2. \qquad \text{[Equation 2]}$$

In Equation 2, a channel is a single input single output (SISO), for each transmission beam, and $h_{i,j}$ may denote the complex channel gain between the $i^{th}$ transmission beam and the $j^{th}$ reception beam

SUMMARY

An aspect of the present invention provides a method of generating a simple codebook based on a Hadamard matrix and thus, a number of weighted-vectors may be reduced and a complexity of hardware may decrease due to a simple antenna gain.

According to an aspect of the present invention, there is provided a transmission beamforming apparatus generating a transmission beam based on a codebook, the apparatus including a codebook storage unit to store a transmission codebook generated based on a Hadamard matrix, a transmission beamforming unit to generate the transmission beam based on a weighted-vector of the transmission codebook or channel information.

The transmission codebook may be generated based on a multiplication of $\Phi_{(R/2+1) \times R}$ and a matrix obtained by performing $\log_2 R - 1$ permutations with respect to an R×R Hadamard matrix based on a number (R) of antennas of the transmission beamforming apparatus, and $\Phi_{(R/2+1) \times R}$ is defined by the following equation:

$$\Phi_{(R/2+1) \times R} = \begin{bmatrix} 1 & 0 & 0 & 0 & 0 & \ldots & 0 & 0 & 0 \\ 0 & 1 & 1 & 0 & 0 & \ldots & 0 & 0 & 0 \\ 0 & 0 & 0 & 1 & 1 & \ldots & 0 & 0 & 0 \\ & & & \vdots & & & & \vdots & \\ 0 & 0 & 0 & 0 & 0 & \ldots & 1 & 1 & 0 \\ 0 & 0 & 0 & 0 & 0 & \ldots & 0 & 0 & 1 \end{bmatrix}.$$

The channel information may include a weighted-vector that is based on a channel condition, and the transmission beamforming unit may generate the transmission beam based on the weighted-vector that is based on the channel condition.

The weighted-vector based on the channel condition may be calculated by performing estimating a channel gain, by sequentially changing a reception beam of a reception beamforming apparatus based on a reception codebook of the reception beamforming apparatus for each change of a transmission beam of the transmission beamforming apparatus based on the transmission codebook, and using both a channel gain estimated with respect to a reception beam that maximizes a diversity gain calculated based on the estimated channel gain and the transmission codebook of the transmission beamforming apparatus.

The weighted-vector based on the channel condition may be calculated by estimating a channel gain by sequentially changing a reception beam of a reception beamforming apparatus based on a reception codebook of the reception beamforming apparatus for each change of a transmission beam of the transmission beamforming apparatus based on the transmission codebook, and using, with respect to each reception beam, a corresponding channel gain and the transmission codebook of the transmission beamforming apparatus, and the transmission beamforming unit may generate a transmission beam for each reception beam based on the weighted-vector that is based on the channel condition and may repeatedly transmit data, a number of the transmissions being the same as a number of reception beams.

According to an aspect of the present invention, there is provided a reception beamforming apparatus generating a reception beam based on a codebook, the apparatus including a codebook storage to store a reception codebook generated based on a Hadamard matrix, a reception beamforming unit to generate a reception beam based on a weighted-vector of the reception codebook, and a spatial diversity processing apparatus being connected to the reception beamforming unit and transmitting channel information to a transmission beamforming apparatus.

The reception codebook may be generated based on a multiplication of $\Phi_{(R/2+1)\times R}$ and a matrix obtained by performing $\log_2 R - 1$ permutations with respect to an R×R Hadamard matrix based on a number (R) of antennas of the reception beamforming apparatus, and $\Phi_{(R/2+1)\times R}$ is defined by the following equation:

$$\Phi_{(R/2+1)\times R} = \begin{bmatrix} 1 & 0 & 0 & 0 & 0 & \ldots & 0 & 0 & 0 \\ 0 & 1 & 1 & 0 & 0 & \ldots & 0 & 0 & 0 \\ 0 & 0 & 0 & 1 & 1 & \ldots & 0 & 0 & 0 \\ & & & \vdots & & & & \vdots & \\ 0 & 0 & 0 & 0 & 0 & \ldots & 1 & 1 & 0 \\ 0 & 0 & 0 & 0 & 0 & \ldots & 0 & 0 & 1 \end{bmatrix}.$$

The channel information may include at least one of a channel gain, a diversity gain, and a weighted-vector that is based on the channel condition.

The weighted-vector based on the channel condition may be calculated by estimating a channel gain by sequentially changing a reception beam of the reception beamforming apparatus based on the reception codebook of the reception beamforming apparatus for each change of a transmission beam of the transmission beamforming apparatus based on a transmission codebook of the transmission beamforming apparatus, and using both a channel gain estimated with respect to a reception beam that maximizes a diversity gain calculated based on the estimated channel gain and the transmission codebook of the transmission beamforming apparatus.

The weighted-vector based on the channel condition is calculated by estimating a channel gain by sequentially changing a reception beam of the reception beamforming apparatus based on the reception for each change of a transmission beam of the transmission beamforming apparatus based on a transmission codebook of the transmission beamforming apparatus, and using, with respect to each reception beam, a corresponding channel gain and the transmission codebook of the transmission beamforming apparatus, and the transmission beamforming unit may generate a transmission beam for each reception beam based on the weighted-vector that is based on the channel condition and may repeatedly transmit data, a number of the transmissions being the same as a number of reception beams.

According to an aspect of the present invention, there is provided a transceiving beamforming wireless communication system, the system including a transmission beamforming apparatus to generate a transmission beam based on a transmission codebook generated based on a Hadamard matrix, a reception beamforming apparatus to generate a reception beam based on a reception codebook generated based on the Hadamard matrix, and a spatial diversity processing apparatus being connected to the reception beamforming apparatus, and transmitting channel information to the transmission beamforming apparatus.

The transmission codebook may be generated based on a multiplication of $\Phi_{(R/2+1)\times R}$ and a matrix obtained by performing $\log_2 R - 1$ permutations with respect to an R×R Hadamard matrix based on a number (R) of antennas of the transmission beamforming apparatus and the reception codebook may be generated based on a multiplication of $\Phi_{(R/2+1)\times R}$ and a matrix obtained by performing $\log_2 R - 1$ permutations with respect to the R×R Hadamard matrix based on a number (R) of antennas of the reception beamforming apparatus, and $\Phi_{(R/2+1)\times R}$ is defined by the following equation:

$$\Phi_{(R/2+1)\times R} = \begin{bmatrix} 1 & 0 & 0 & 0 & 0 & \ldots & 0 & 0 & 0 \\ 0 & 1 & 1 & 0 & 0 & \ldots & 0 & 0 & 0 \\ 0 & 0 & 0 & 1 & 1 & \ldots & 0 & 0 & 0 \\ & & & \vdots & & & & \vdots & \\ 0 & 0 & 0 & 0 & 0 & \ldots & 1 & 1 & 0 \\ 0 & 0 & 0 & 0 & 0 & \ldots & 0 & 0 & 1 \end{bmatrix}.$$

The channel information may include a weighted-vector that is based on the channel condition, and the transmission beamforming apparatus may generate the transmission beam based on the weighed-vector that is factoring in the channel condition.

The weighted-vector based on the channel condition may be calculated by estimating a channel gain by sequentially changing a reception beam of the reception beamforming apparatus based on the reception codebook for each change of a transmission beam of the transmission beamforming apparatus based on the transmission codebook, and using both a channel gain estimated with respect to a reception beam that maximizes a diversity gain calculated based on the estimated channel gain and the transmission codebook of the transmission beamforming apparatus.

The weighted-vector based on the channel condition may be calculated by estimating the channel gain by sequentially changing a reception beam of the reception beamforming apparatus based on the reception codebook for each change of a transmission beam of the transmission beamforming apparatus based on the transmission codebook, and using, with respect to each reception beam, a corresponding channel gain and the transmission codebook of the transmission beamforming apparatus, and the transmission beamforming apparatus may generate a transmission beam for each reception beam based on the weighted-vector based on the channel condition and may repeatedly transmit data, a number of the transmissions being the same as a number of reception beams.

According to an aspect of the present invention, there is provided a transmission beam generating method based on a codebook, the method including transmitting a sequence to a reception beamforming apparatus, by sequentially changing a beam of the transmission beamforming apparatus based on a transmission codebook of a transmission beamforming apparatus for a predetermined beam of the reception beamforming apparatus based on a reception codebook of the reception beamforming apparatus, receiving, by the reception beamforming apparatus, the sequence to estimate a channel gain, sequentially estimating a channel gain with respect to all beams of the reception beamforming apparatus, calculating a weighted-vector that is based on the channel condition based on the transmission codebook of the transmission beamforming apparatus and based on a channel gain estimated with respect to a reception beam that maximizes a diversity gain, the diversity gain being calculated through the estimated channel gain, and generating the transmission beam based on the weighted-vector that is based on the channel condition.

According to an aspect of the present invention, there is provided a transmission beam generating method, the method including transmitting a sequence to a reception beamforming apparatus, by sequentially changing a beam of the transmission beamforming apparatus based on a transmission codebook of a transmission beamforming apparatus for a predetermined beam of the reception beamforming apparatus based on a reception codebook of the reception beamforming apparatus, receiving, by the reception beamforming apparatus, the sequence to estimate a channel gain, sequentially estimating a channel gain with respect to all beams of the reception beamforming apparatus, calculating a weighted-vector that is based on the channel condition based on the transmission codebook of the transmission beamforming apparatus and based on the a channel gain estimated for each of reception beams, and generating a transmission beam with respect to each of the reception beams based on the weighted-vector that is based on the channel condition, and repeatedly transmitting data, a number of the transmissions being the same as a number of the reception beams.

According to an aspect of the present invention, there is provided a codebook generating method, the method including generating a codebook of a transmission beamforming apparatus or a reception beamforming apparatus based on a multiplication of $\Phi_{(R/2+1)\times R}$ and a matrix obtained by performing $\log_2 R - 1$ permutations with respect to an R×R Hadamard matrix based on a number (R) of antennas of the transmission beamforming apparatus or the reception beamforming apparatus, and $\Phi_{(R/2+1)\times R}$ is defined by the following equation:

$$\Phi_{(R/2+1)\times R} = \begin{bmatrix} 1 & 0 & 0 & 0 & 0 & \ldots & 0 & 0 & 0 \\ 0 & 1 & 1 & 0 & 0 & \ldots & 0 & 0 & 0 \\ 0 & 0 & 0 & 1 & 1 & \ldots & 0 & 0 & 0 \\ & & & \vdots & & & & \vdots & \\ 0 & 0 & 0 & 0 & 0 & \ldots & 1 & 1 & 0 \\ 0 & 0 & 0 & 0 & 0 & \ldots & 0 & 0 & 1 \end{bmatrix}.$$

According to example embodiments of the present invention, there may be provided a codebook generating method and apparatus that reduces a complexity of hardware based on a multi-transmission antenna and weights with respect to each antenna when an antenna to generate a multi-beam is embodied, and a multi-beam is generated at regular intervals.

According to example embodiments of the present invention, a diversity gain may be maximized based on a spatial diversity processing apparatus and a beamforming weighted-vector may be systematically generated.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
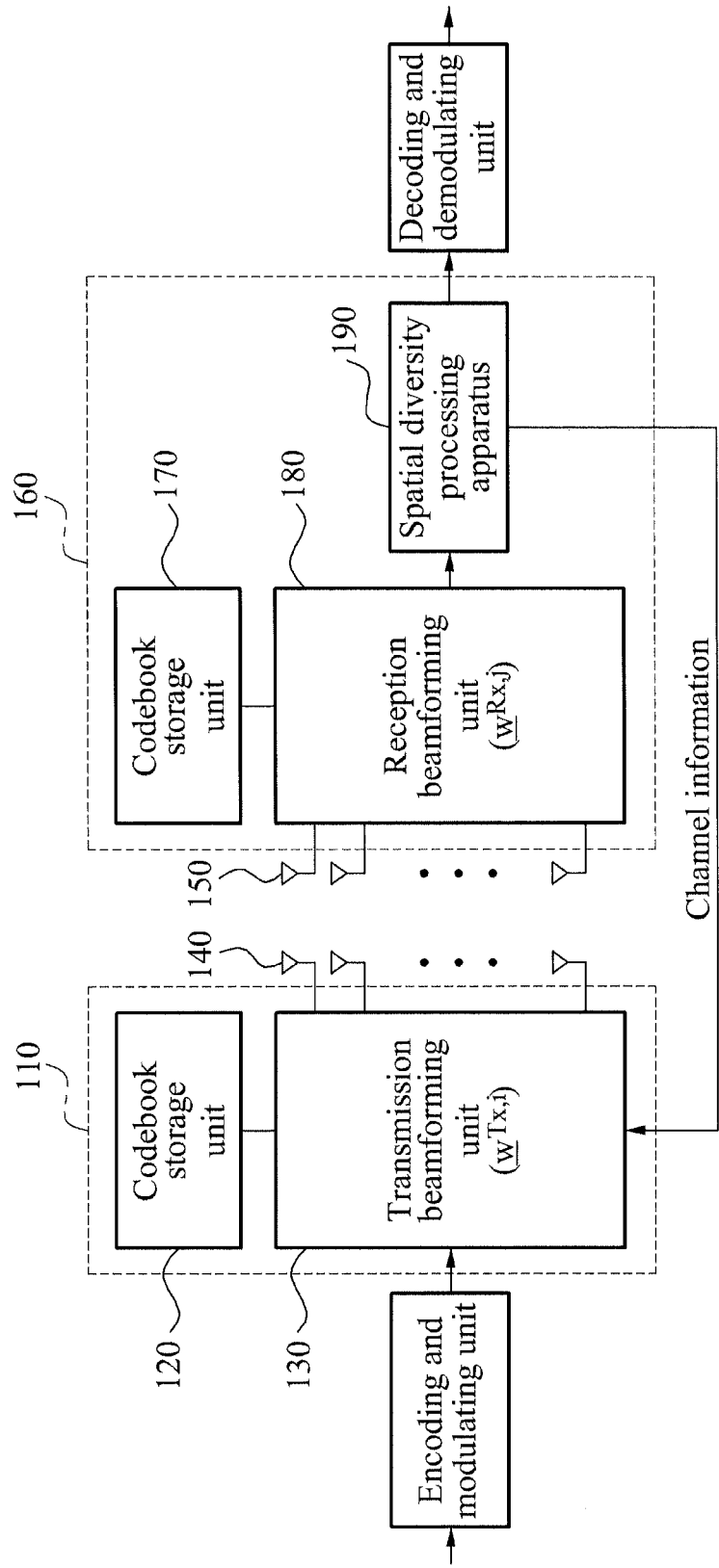
FIG. 1 is a diagram illustrating a configuration of a transceiving apparatus of a multi-antenna system according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a configuration of a transceiving apparatus of a multi-antenna system according to an embodiment of the present invention.

A communication system of FIG. 1 where a beamforming apparatus is applied is roughly illustrated since example embodiments are described in terms of channel gain estimation based on a codebook of a single beam and multi-beamforming based on the estimated channel gain. A transmitting end may be configured to include a transmission beamforming apparatus 110 where a codebook generated according to an embodiment is applied, and a transmission antenna 140. The transmission beamforming apparatus 110 may include a codebook storage unit 120 and a transmission beamforming unit 130. A receiving end may be configured to include a reception antenna 150, a reception beamforming apparatus 160 where the codebook generated based on an embodiment is applied, and a demodulating and decoding unit. The reception beamforming apparatus 160 may include a transmission/reception codebook storage unit 170, a reception beamforming unit 180 where the codebook generated based on an embodiment is applied, and a spatial diversity processing apparatus 190 to maximize an antenna gain.

In this example, a weighted-vector that is used for a transmission beamforming apparatus where an $i^{th}$ beam of the codebook may be $w^{Tx,i} = [w_1^{Tx,i}, w_2^{Tx,i}, \ldots, w_N^{Tx,i}]$, and a weighted-vector that is used for a reception beamforming apparatus where a $j^{th}$ beam of the codebook may be $w^{Rx,j} = [w_1^{Rx,j}, w_2^{Rx,j}, \ldots, w_N^{Rx,j}]$. A number of antennas used by the transmission beamforming apparatus may be N and a number of antennas used by the reception beamforming apparatus may be M.

Referring to FIG. 1, the spatial diversity processing apparatus 190 of the receiving end may estimate a channel gain, and there may exist an reverse transmission path that may be used to transmit the estimated channel gain to the transmitting end to generate a transmission beam based on the estimated channel gain. In this example, the generated transmission beam may be in a form of a multi-beam, and a reception beam may be in a form of a single beam.

Figure 2:
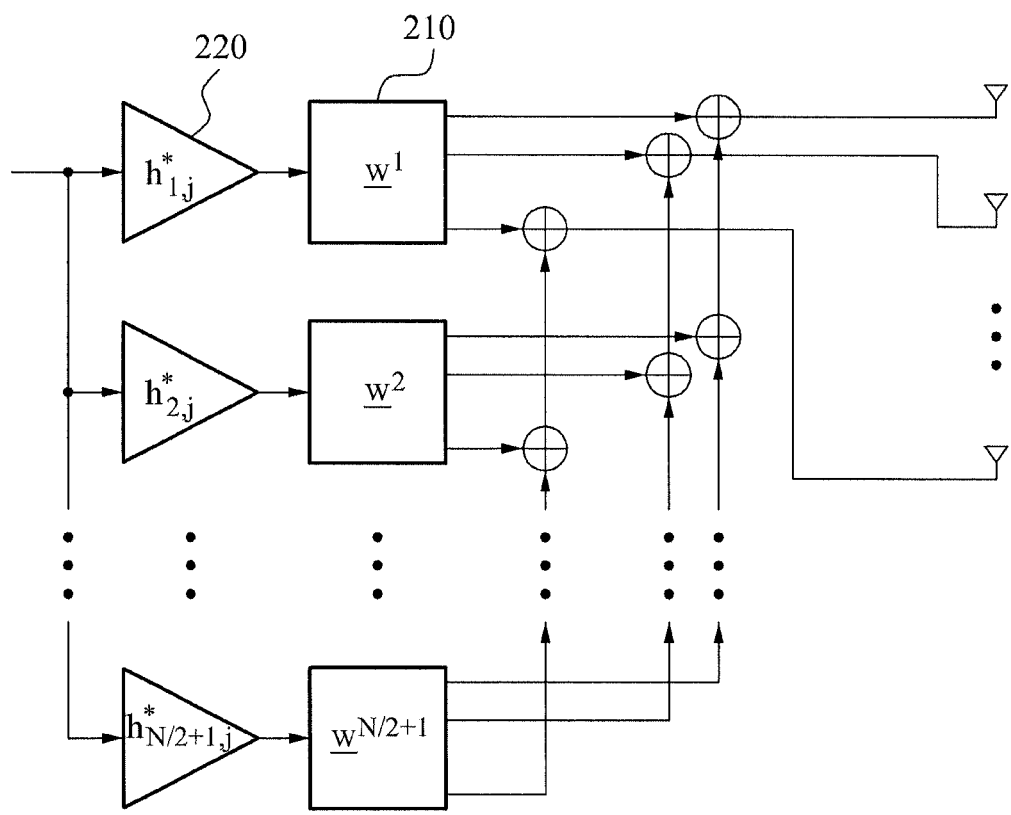
FIG. 2 is a diagram illustrating an equivalent structure of a transmission beamforming apparatus that generates a transmission beam based on an estimated channel gain and a directional single beam of a transmission codebook according to an embodiment of the present invention.

FIG. 2 illustrates an equivalent structure of a transmission beamforming apparatus that generates a transmission beam based on an estimated channel gain and a directional single beam of a transmission codebook according to an embodiment of the present invention.

Referring to FIG. 2, the transmission beamforming apparatus may arrange a weighted-vector of directionally transmitting single beam 210 after a multiplexer 220 that multiplies conjugate of values of the estimated channel gain, may add signals where weights of the same antenna is applied, and may transmit the added signals to the antenna.

Figure 3:
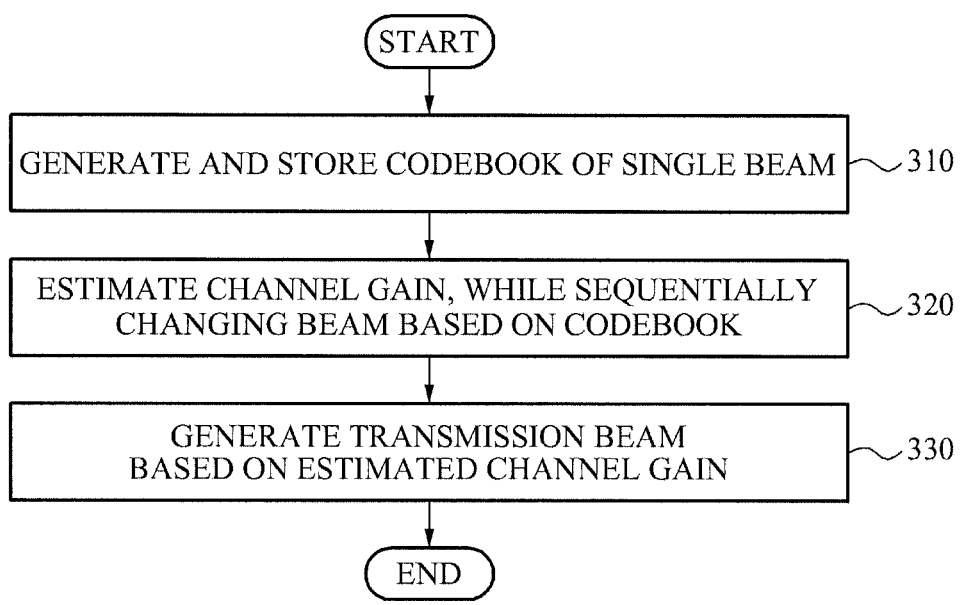
FIG. 3 is a flowchart illustrating a beamforming method according to an embodiment of the present invention.

FIG. 3 illustrates a beamforming method according to an embodiment of the present invention.

Referring to FIG. 3, a codebook of a directional single beam, which is simple and has regular beam intervals, is generated and stored in operation 310. A channel gain between a transmitting end and a receiving end is estimated by sequentially changing a single beam of a reception codebook in a reception beamforming apparatus for each change of a single beam of a transmission codebook in a transmission beamforming apparatus in operation 320. The estimated channel gain is transmitted to the transmitting end and is used for transmission beamforming in operation 330.

A codebook generating method based on a Hadamard matrix according to an embodiment of the present invention will be described.

To generate a codebook of the directional single beam having regular beam intervals and including R/2+1 types of weights, $\log_2 R - 1$ permutations may be performed with respect to an R×R Hadamard matrix based on a number of antennas, that is, R. The Hadamard matrix may be expressed by Equation 3.

$$Hadamard\ (2^n) = \begin{pmatrix} H(2^n-1) & H(2^n-1) \\ H(2^n-1) & -H(2^n-1) \end{pmatrix} \quad \text{[Equation 3]}$$

The Hadamard matrix may be in a form of $2^n$ and thus, may be expressed as a R×R matrix, and may generate a matrix defined by Equation 4 to perform the permutation.

$$A = \begin{bmatrix} 1 & 0 \\ 0 & 0 \end{bmatrix}, B = \begin{bmatrix} 0 & 0 \\ 1 & 0 \end{bmatrix}, C = \begin{bmatrix} 0 & 0 \\ 0 & 1 \end{bmatrix}, D = \begin{bmatrix} 0 & 1 \\ 0 & 0 \end{bmatrix}, \quad \text{[Equation 4]}$$

Equation 4 may be used to configure a first permutation regardless of the number of antennas, that is, R. When R is four, the permutation is performed once, and in this example, a permutation matrix may be expressed by Equation 5.

$$P_1^4 = \begin{bmatrix} A & B \\ C & D \end{bmatrix} \quad \text{[Equation 5]}$$

A first permutation of when R is '8' or '16' may be in a form of Equation 5. In this example, A, B, C, and D may be 2×2 matrix, and '0' may denote a zero matrix.

The first permutation based on R may be generated based on a matrix defined by Equation 6 and the zero matrix.

$$P_1^8 = \begin{bmatrix} A & B & 0 & 0 \\ 0 & 0 & A & B \\ 0 & 0 & C & D \\ C & D & 0 & 0 \end{bmatrix} \quad \text{[Equation 6]}$$

$$P_1^{16} = \begin{bmatrix} A & B & 0 & 0 & 0 & 0 & 0 & 0 \\ 0 & 0 & A & B & 0 & 0 & 0 & 0 \\ 0 & 0 & 0 & 0 & A & B & 0 & 0 \\ 0 & 0 & 0 & 0 & 0 & 0 & A & B \\ 0 & 0 & 0 & 0 & 0 & 0 & C & D \\ 0 & 0 & 0 & 0 & C & D & 0 & 0 \\ 0 & 0 & C & D & 0 & 0 & 0 & 0 \\ C & D & 0 & 0 & 0 & 0 & 0 & 0 \end{bmatrix}$$

When R is '8', a second permutation may be calculated by Equation 7 using $P_1^4$ that is calculated first under the condition that R is '4'.

$$P_2^8 = \begin{bmatrix} P_1^4 & 0 \\ 0 & JP_1^4 J \end{bmatrix} \quad \text{[Equation 7]}$$

In Equation 7, a matrix J may denote a matrix in a form where a sequence of a column or a row of a unit matrix $I_{(R/2)*(R/2)}$ is changed. A second permutation and a third permutation of when the R is '16' may be expressed by Equation 8.

$$P_2^{16} = \begin{bmatrix} P_1^8 & 0 \\ 0 & JP_1^8 J \end{bmatrix} P_3^{16} = \begin{bmatrix} P_2^8 & 0 \\ 0 & JP_2^8 J \end{bmatrix} \quad \text{[Equation 8]}$$

Therefore, when the number of antennas, that is, R, increases to $2^n$, a current permutation matrix may be calculated based on a previous permutation matrix. Equation 9 may be used to calculate a codebook that is a set of weighted-vectors of the directional single beam, being obtained after transforming the Hadamard matrix using $\log_2 R - 1$ permutation matrices.

$$H_{R \times (R/2+1)} = \left( \Phi_{(R/2+1) \times R} \cdot \left( \prod_{i=1}^{N} P_{N-i+1}^{(R)} \right) \cdot H_{R \times R} \right)^T \quad \text{[Equation 9]}$$

In this example, $\Phi_{(R/2+1) \times R}$ may be expressed by Equation 10.

$$\Phi_{(R/2+1) \times R} = \begin{bmatrix} 1 & 0 & 0 & 0 & 0 & \cdots & 0 & 0 & 0 \\ 0 & 1 & 1 & 0 & 0 & \cdots & 0 & 0 & 0 \\ 0 & 0 & 0 & 1 & 1 & \cdots & 0 & 0 & 0 \\ & & & \vdots & & & & \vdots & \\ 0 & 0 & 0 & 0 & 0 & \cdots & 1 & 1 & 0 \\ 0 & 0 & 0 & 0 & 0 & \cdots & 0 & 0 & 1 \end{bmatrix} \quad \text{[Equation 10]}$$

A $k^{th}$ column in a matrix of Equation 9 may be a $k^{th}$ weighted-vector of the codebook and may be used when a directional single beam is sequentially changed, and may be defined as a weighted-vector $\underline{w}^k=[w_1^k, w_2^k, \ldots, w_N^k]$ of a one-dimensional array antenna, which is expressed by Equation 11.

$$\underline{w}^k = H_{R\times(R/2+1)}(:,k) \quad \text{[Equation 11]}$$

In Equation 11, A(:,k) may denote a $k^{th}$ column vector of a matrix A.

According to the present embodiment, a codebook of when R=8 and R/2+1=5 may be expressed by Equation 12.

$$H_{8\times 5} = \begin{pmatrix} 1 & 1 & 1 & 1 & 1 \\ 1 & 1 & 0 & -1 & -1 \\ 1 & 0 & -1 & 0 & 1 \\ 1 & 0 & 0 & 0 & -1 \\ 1 & -1 & 1 & -1 & 1 \\ 1 & -1 & 0 & 1 & -1 \\ 1 & 0 & -1 & 0 & 1 \\ 1 & 0 & 0 & 0 & -1 \end{pmatrix} \quad \text{[Equation 12]}$$

Figure 4:
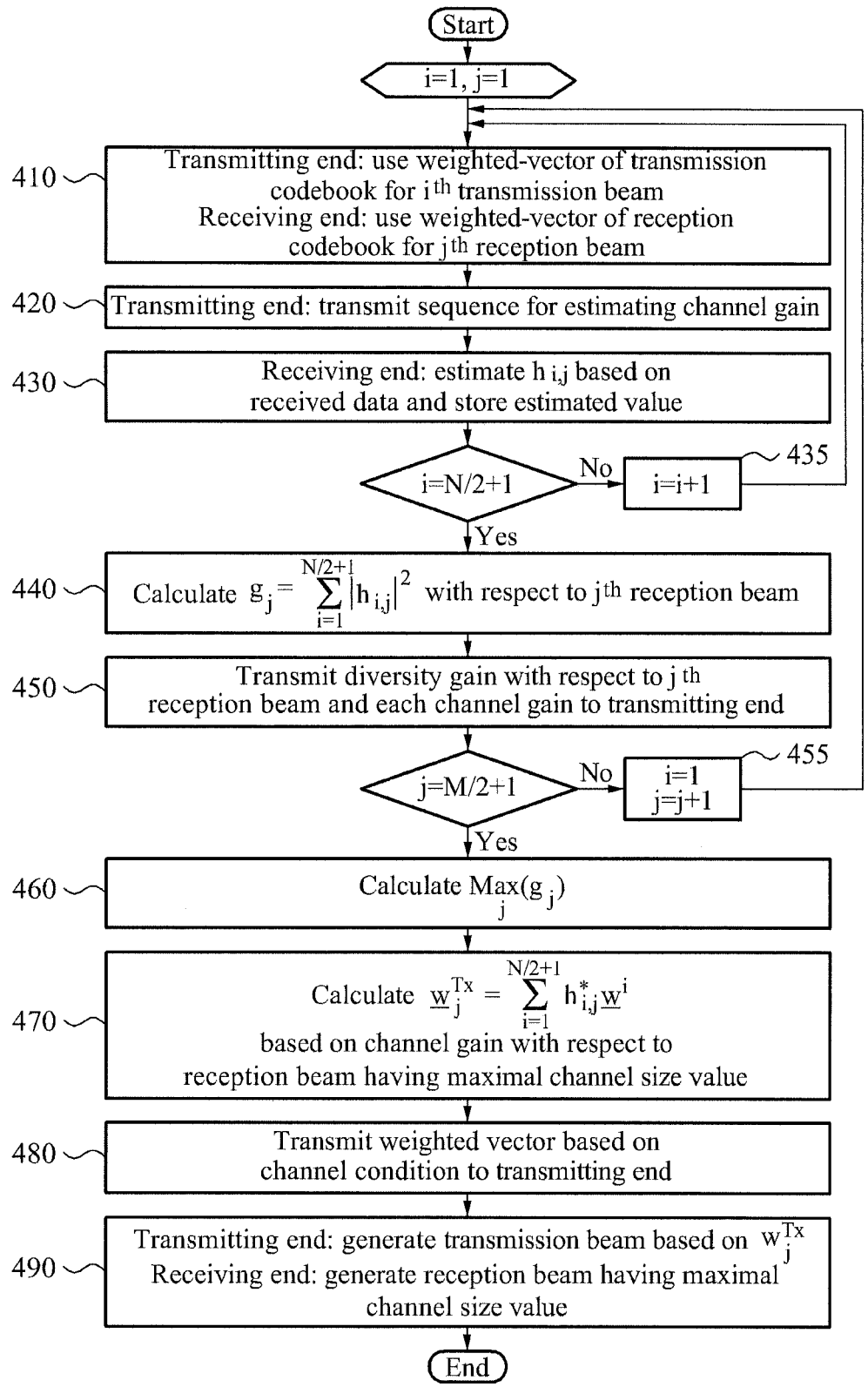
FIG. 4 is a flowchart illustrating a channel gain estimation performed by sequentially changing a beam based on a codebook, and a beamforming method based on the estimated channel gain when only a transmit diversity is used.

FIG. 4 illustrates a channel gain estimation performed by sequentially changing a beam based on a codebook, and a beamforming method based on the estimated channel gain when only a transmit diversity is used.

Referring to FIG. 4, a sequence may be transmitted in operation 420, and in operation 410. The sequence may be transmitted in operation 420 by sequentially changing a transmission beam based on a transmission codebook of a directional single beam, the transmission codebook being generated according to an embodiment of the present invention for a fixed reception beam of the receiving end 160 based on a reception codebook of a directional single beam, the reception codebook being generated according to an embodiment of the present invention.

In this example, the transmission codebook and reception codebook may be a transmission codebook and a reception codebook of Equation 9 that are generated by performing $\log_2 R - 1$ permutations with respect to an R×R Hadamard matrix based on a number of antennas, that is, R.

The spatial diversity processing apparatus 190 in the reception beamforming apparatus 160 may estimate and store a channel gain $h_{i,j}$ based on the received sequence in operation 430. The channel gain $h_{i,j}$ may be estimated for each transmission beam by sequentially changing a transmission beam in operation 435, and a diversity gain with respect to the reception beam is calculated in operation 440. In this example, a diversity gain with respect to a $j^{th}$ reception beam may be defined by Equation 13.

$$g_j = \sum_{i}^{N/2+1} |h_{i,j}|^2 \quad \text{[Equation 13]}$$

In Equation 13, N/2+1 may denote a number of transmission beams.

The estimated channel gain and the calculated diversity gain may be transmitted to the transmission beamforming apparatus 110 through a reverse transmission path in operation 450. The estimated channel gain and the diversity gain may be stored in the codebook storage unit 120 of the transmission beamforming apparatus 110. The above described processes may be applied to all reception beams in operation 455.

A reception beam corresponding to a maximal value from among diversity gain with respect to all reception beams is selected in operation 460, and a weighted-vector $\underline{w}_j^{Tx}$ that is based on a channel condition of the transmission beamforming apparatus 110 may be calculated by Equation 14 based on a channel gain corresponding to a selected $j^{th}$ reception beam in operation 470.

$$w_j^{Tx} = \sum_{i=1}^{N/2+1} h_{i,j}^* \underline{w}^j \quad \text{[Equation 14]}$$

The spatial diversity processing apparatus 190 transmits, to the transmission beamforming apparatus 110, the weighted-vector that is based on the channel condition in operation 480. The weighted-vector based on the channel condition may be stored in the codebook storage unit 120 of the transmission beamforming apparatus 110.

The transmission beamforming unit 130 of the transmission beamforming apparatus 110 generates a transmission beam based on the weighted-vector that is based on the channel condition, and the reception beamforming unit 180 of the reception beamforming apparatus 160 may generate a reception beam that maximizes a diversity gain in operation 490.

Figure 5:
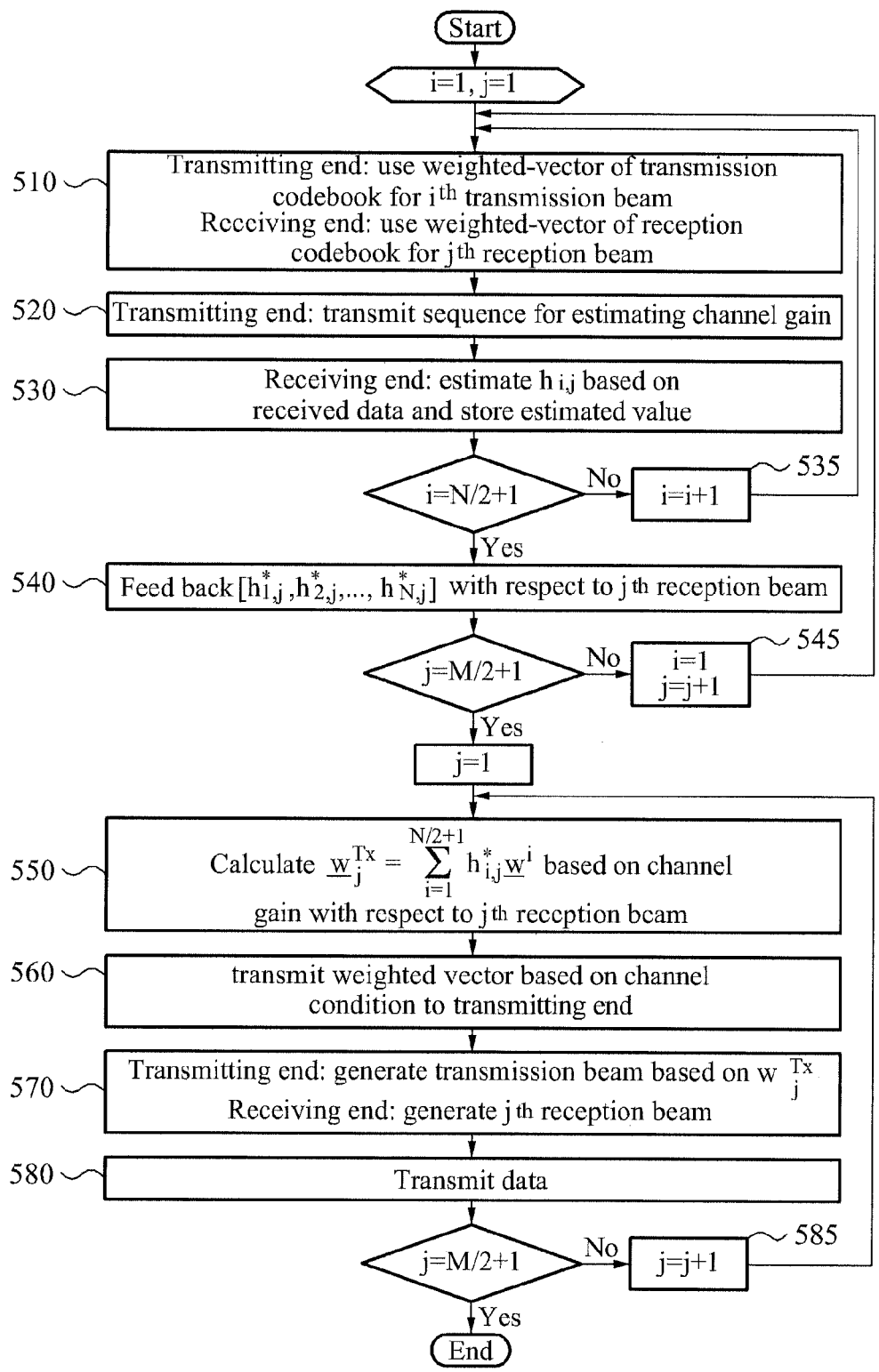
FIG. 5 is a flowchart illustrating a channel gain estimation performed by sequentially changing a beam based on a codebook, and a beamforming method based on the estimated channel gain when both a transmit diversity and a receive diversity are used.

FIG. 5 illustrates a channel gain estimation performed by sequentially changing a beam based on a codebook, and a beamforming method based on the estimated channel gain when both a transmit diversity and a receive diversity are used.

Referring to FIG. 5, a transmission beam is formed with respect to each reception beam to use both a transmit diversity and a receive diversity and thus, data is retransmitted, a number of the transmissions being the same as a number of reception beams.

Referring to FIG. 5, a sequence may be transmitted in operation 520 by sequentially changing a transmission beam based on a transmission codebook of a directional single beam, the transmission codebook being generated according to an embodiment of the present invention, for a fixed reception beam of a receiving end based on a reception codebook of a directional single beam, the reception code book being generated according to an embodiment, in operation 510.

In this example, the transmission codebook and the reception codebook may be a transmission codebook and a reception codebook of Equation 9 that are generated based on a multiplication of a matrix of Equation 10 and a matrix obtained by performing $\log_2 R - 1$ permutations with respect to an R×R Hadamard matrix based on a number of antennas, that is, R.

The spatial diversity processing apparatus 190 of the reception beamforming apparatus 160 may estimate and store a channel gain based on the received sequence in operation 530. In the same manner, a channel gain $h_{i,j}$ is estimated with respect to all transmission beams in operation 535, and the channel gain $h_{i,j}$ or a channel condition vector $[h_{1,i}^*, h_{2,i}^*, \ldots, h_{N,i}^*]$ is transmitted to the transmission beamforming apparatus 110 through a reverse transmission path in operation 540. The above channel information may be stored in the codebook storage unit 120 of the transmission beamforming apparatus 110. The above described process is applied to all reception beams in operation 545.

The spatial diversity processing apparatus 190 calculates, by Equation 14, a weighted-vector $\underline{w}_1^{Tx}$ that is based on a channel condition of each transmission beam of the transmission beamforming apparatus 110, based on a channel gain obtained, through the described process, with respect to a first reception beam in operation 550. The spatial diversity processing apparatus 190 transmits, to the transmission beamforming apparatus 110, the weighted-vector that is based on the channel condition in operation 560. The weighted-vector based on the channel condition may be stored in the codebook storage unit 120 of the transmission beamforming apparatus 110. The transmission beamforming unit 130 of the transmission beamforming apparatus 110 generates a transmission beam based on the weighted-vector that is based on the channel condition in operation 570, and transmits data in operation 580. In this manner, all receive beams are sequentially processed in operation 585 and thus, a reception diversity effect is obtained.

In this example, a $j^{th}$ reception-beam weighted-vector obtained in operation 570 may be defined by Equation 15 based on a column vector obtained from Equation 9.

$$\underline{w}_j^{Rx} = H_{R \times (R/2+1)}(:,j) \qquad \text{[Equation 15]}$$

The transmission and reception beam weighted-vectors in Equation 14 and Equation 15 may be a primary antenna array, and a weighted matrix appropriate for a secondary antenna array may be calculated based on Equation 1.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A transmission beamforming apparatus generating a transmission beam based on a codebook, the apparatus comprising:
    a codebook storage unit to store a transmission codebook generated based on a Hadamard matrix; and
    a transmission beamforming unit to generate the transmission beam based on a weighted-vector of the transmission codebook or channel information,
    wherein the channel information includes a weighted-vector that is based on a channel condition,
    wherein the weighted-vector based on the channel condition is calculated by performing:
        estimating a channel gain, by sequentially changing a reception beam of a reception beamforming apparatus based on a reception codebook of the reception beamforming apparatus for each change of a transmission beam of the transmission beamforming apparatus based on the transmission codebook; and
        using both a channel gain estimated with respect to a reception beam that maximizes a diversity gain calculated based on the estimated channel gain and the transmission codebook of the transmission beamforming apparatus.

2. The apparatus of claim 1, wherein the transmission codebook is generated based on a multiplication of $\Phi_{(R/2+1) \times R}$ and a matrix obtained by performing $\log_2 R - 1$ permutations with respect to an R×R Hadamard matrix based on a number (R) of antennas of the transmission beamforming apparatus, and $\Phi_{(R/2+1) \times R}$ is defined by the following equation:

$$\Phi_{(R/2+1) \times R} = \begin{bmatrix} 1 & 0 & 0 & 0 & 0 & \cdots & 0 & 0 & 0 \\ 0 & 1 & 1 & 0 & 0 & \cdots & 0 & 0 & 0 \\ 0 & 0 & 0 & 1 & 1 & \cdots & 0 & 0 & 0 \\ & & & \vdots & & & & \vdots & \\ 0 & 0 & 0 & 0 & 0 & \cdots & 1 & 1 & 0 \\ 0 & 0 & 0 & 0 & 0 & \cdots & 0 & 0 & 1 \end{bmatrix}.$$

3. A transmission beamforming apparatus generating a transmission beam based on a codebook, the apparatus comprising:
    a codebook storage unit to store a transmission codebook generated based on a Hadamard matrix; and
    a transmission beamforming unit to generate the transmission beam based on a weighted-vector of the transmission codebook or channel information,
    wherein the channel information includes a weighted-vector that is based on a channel condition,
    wherein:
    the weighted-vector based on the channel condition is calculated by estimating a channel gain by sequentially changing a reception beam of a reception beamforming apparatus based on a reception codebook of the reception beamforming apparatus for each change of a transmission beam of the transmission beamforming apparatus based on the transmission codebook, and using, with respect to each reception beam, a corresponding channel gain and the transmission codebook of the transmission beamforming apparatus; and
    the transmission beamforming unit generates a transmission beam for each reception beam based on the weighted-vector that is based on the channel condition and repeatedly transmits data, a number of the transmissions being the same as a number of reception beams.

4. A reception beamforming apparatus generating a reception beam based on a codebook, the apparatus comprising:
    a codebook storage to store a reception codebook generated based on a Hadamard matrix;
    a reception beamforming unit to generate a reception beam based on a weighted-vector of the reception codebook; and
    a spatial diversity processing apparatus being connected to the reception beamforming unit and transmitting channel information to a transmission beamforming apparatus,
    wherein the channel information includes at least one of a channel gain, a diversity gain, and a weighted-vector that is based on the channel condition, and
    wherein the weighted-vector based on the channel condition is calculated by estimating a channel gain by sequentially changing a reception beam of the reception beamforming apparatus based on the reception codebook of the reception beamforming apparatus for each change of a transmission beam of the transmission beamforming apparatus based on a transmission codebook of the transmission beamforming apparatus, and using both a channel gain estimated with respect to a reception beam that maximizes a diversity gain calculated based on the estimated channel gain and the transmission codebook of the transmission beamforming apparatus.

5. The apparatus of claim 4, wherein the weighted-vector based on the channel condition is calculated by estimating a channel gain by sequentially changing a reception beam of the reception beamforming apparatus based on the reception for each change of a transmission beam of the transmission beamforming apparatus based on a transmission codebook of the transmission beamforming apparatus, and using, with respect to each reception beam, a corresponding channel gain and the transmission codebook of the transmission beamforming apparatus.

6. A reception beamforming apparatus generating a reception beam based on a codebook, the apparatus comprising:
a codebook storage to store a reception codebook generated based on a Hadamard matrix;
a reception beamforming unit to generate a reception beam based on a weighted-vector of the reception codebook; and
a spatial diversity processing apparatus being connected to the reception beamforming unit and transmitting channel information to a transmission beamforming apparatus,
wherein the reception codebook is generated based on a multiplication of $\Phi_{(R/2+1) \times R}$ and a matrix obtained by performing $\log_2 R-1$ permutations with respect to an $R \times R$ Hadamard matrix based on a number (R) of antennas of the reception beamforming apparatus, and $\Phi_{(R/2+1) \times R}$ is defined by the following equation:

$$\Phi_{(R/2+1) \times R} = \begin{bmatrix} 1 & 0 & 0 & 0 & 0 & \cdots & 0 & 0 & 0 \\ 0 & 1 & 1 & 0 & 0 & \cdots & 0 & 0 & 0 \\ 0 & 0 & 0 & 1 & 1 & \cdots & 0 & 0 & 0 \\ & & & \vdots & & & & \vdots & \\ 0 & 0 & 0 & 0 & 0 & \cdots & 1 & 1 & 0 \\ 0 & 0 & 0 & 0 & 0 & \cdots & 0 & 0 & 1 \end{bmatrix}.$$

7. A beamforming wireless communication system, the system comprising:
a transmission beamforming apparatus to generate a transmission beam based on a transmission codebook generated based on a Hadamard matrix;
a reception beamforming apparatus to generate a reception beam based on a reception codebook generated based on the Hadamard matrix; and
a spatial diversity processing apparatus being connected to the reception beamforming apparatus, and transmitting channel information to the transmission beamforming apparatus,
wherein:
the channel information includes a weighted-vector that is based on the channel condition; and
the transmission beamforming apparatus generates the transmission beam based on the weighed-vector that is factoring in the channel condition, and
wherein the weighted-vector based on the channel condition is calculated by estimating a channel gain by sequentially changing a reception beam of the reception beamforming apparatus based on the reception codebook for each change of a transmission beam of the transmission beamforming apparatus based on the transmission codebook, and using both a channel gain estimated with respect to a reception beam that maximizes a diversity gain calculated based on the estimated channel gain and the transmission codebook of the transmission beamforming apparatus.

8. The system of claim 7, wherein the transmission codebook is generated based on a multiplication of $\Phi_{(R/2+1) \times R}$ and a matrix obtained by performing $\log_2 R-1$ permutations with respect to an $R \times R$ Hadamard matrix based on a number (R) of antennas of the transmission beamforming apparatus and the reception codebook is generated based on a multiplication of $\Phi_{(R/2+1) \times R}$ and a matrix obtained by performing $\log_2 R-1$ permutations with respect to the $R \times R$ Hadamard matrix based on a number (R) of antennas of the reception beamforming apparatus, and $\Phi_{(R/2+1) \times R}$ is defined by the following equation:

$$\Phi_{(R/2+1) \times R} = \begin{bmatrix} 1 & 0 & 0 & 0 & 0 & \cdots & 0 & 0 & 0 \\ 0 & 1 & 1 & 0 & 0 & \cdots & 0 & 0 & 0 \\ 0 & 0 & 0 & 1 & 1 & \cdots & 0 & 0 & 0 \\ & & & \vdots & & & & \vdots & \\ 0 & 0 & 0 & 0 & 0 & \cdots & 1 & 1 & 0 \\ 0 & 0 & 0 & 0 & 0 & \cdots & 0 & 0 & 1 \end{bmatrix}.$$

9. A beamforming wireless communication system, the system comprising:
a transmission beamforming apparatus to generate a transmission beam based on a transmission codebook generated based on a Hadamard matrix;
a reception beamforming apparatus to generate a reception beam based on a reception codebook generated based on the Hadamard matrix; and
a spatial diversity processing apparatus being connected to the reception beamforming apparatus, and transmitting channel information to the transmission beamforming apparatus,
wherein:
the channel information includes a weighted-vector that is based on the channel condition; and
the transmission beamforming apparatus generates the transmission beam based on the weighed-vector that is factoring in the channel condition, and
wherein the weighted-vector based on the channel condition is calculated by estimating the channel gain by sequentially changing a reception beam of the reception beamforming apparatus based on the reception codebook for each change of a transmission beam of the transmission beamforming apparatus based on the transmission codebook, and using, with respect to each reception beam, a corresponding channel gain and the transmission codebook of the transmission beamforming apparatus; and
the transmission beamforming apparatus generates a transmission beam for each reception beam based on the weighted-vector based on the channel condition and repeatedly transmits data a number of the transmissions being the same as a number of reception beams.

10. A method of generating a transmission beam based on a codebook, the method comprising:
transmitting a sequence to a reception beamforming apparatus, by sequentially changing a beam of the transmission beamforming apparatus based on a transmission codebook of a transmission beamforming apparatus for a predetermined beam of the reception beamforming apparatus based on a reception codebook of the reception beamforming apparatus;
receiving, by the reception beamforming apparatus, the sequence to estimate a channel gain;
sequentially estimating a channel gain with respect to all beams of the reception beamforming apparatus;
calculating a weighted-vector that is based on the channel condition based on the transmission codebook of the transmission beamforming apparatus and based on a channel gain estimated with respect to a reception beam that maximizes a diversity gain, the diversity gain being calculated through the estimated channel gain; and generating the transmission beam based on the weighted-vector.

11. A method of generating a transmission beam, the method comprising:

transmitting a sequence to a reception beamforming apparatus, by sequentially changing a beam of the transmission beamforming apparatus based on a transmission codebook of a transmission beamforming apparatus for a predetermined beam of the reception beamforming apparatus based on a reception codebook of the reception beamforming apparatus;

receiving, by the reception beamforming apparatus, the sequence to estimate a channel gain;

sequentially estimating a channel gain with respect to all beams of the reception beamforming apparatus;

calculating a weighted-vector that is based on the channel condition based on the transmission codebook of the transmission beamforming apparatus and based on the channel gain estimated for each of reception beams; and generating a transmission beam with respect to each of the reception beams based on the weighted-vector, and repeatedly transmitting data, a number of the transmissions being the same as a number of the reception beams.

* * * * *

UNITED STATES PATENT AND TRADEMARK OFFICE
CERTIFICATE OF CORRECTION

PATENT NO. : 8,750,401 B2  
APPLICATION NO. : 12/969135  
DATED : June 10, 2014  
INVENTOR(S) : Mun Geon Kyeong et al.

Page 1 of 1

It is certified that error appears in the above-identified patent and that said Letters Patent is hereby corrected as shown below:

Title Page, Item (73) add:

--Soongsil University Research Consortium Technopark--.

Signed and Sealed this  
Fifth Day of April, 2016

Michelle K. Lee  
*Director of the United States Patent and Trademark Office*